United States Patent
Shinoda et al.

(10) Patent No.: US 7,132,976 B2
(45) Date of Patent: Nov. 7, 2006

(54) AUTOMOTIVE RADAR

(75) Inventors: Hiroshi Shinoda, Kobubunji (JP);
Toshiyuki Nagasaku, Kokubunji (JP);
Hiroshi Kondoh, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/206,765

(22) Filed: Aug. 19, 2005

(65) Prior Publication Data

US 2006/0158369 A1    Jul. 20, 2006

(30) Foreign Application Priority Data

Jan. 20, 2005    (JP) ............................ 2005-012460

(51) Int. Cl.
- *G01S 13/93*    (2006.01)
- *G01S 13/00*    (2006.01)
- *G08G 1/16*    (2006.01)
- *B60W 30/08*    (2006.01)

(52) U.S. Cl. ............................ 342/70; 342/27; 342/73; 342/74; 342/75; 342/118; 342/128; 342/133; 342/147; 342/158; 342/175; 342/195; 701/300; 701/301

(58) Field of Classification Search ........ 180/167–169; 701/300, 301; 342/27, 28, 70–81, 118, 128–147, 342/158, 175, 195
See application file for complete search history.

(56) References Cited

U.S. PATENT DOCUMENTS

| | | | |
|---|---|---|---|
| 3,886,555 A * | 5/1975 | Royal | 342/78 |
| 3,935,559 A * | 1/1976 | Straffon et al. | 342/71 |
| 6,067,038 A * | 5/2000 | Uehara et al. | 342/70 |
| 6,127,964 A * | 10/2000 | Kageyama | 342/70 |
| 6,243,052 B1 | 6/2001 | Goldstein et al. | |
| 6,665,592 B1 * | 12/2003 | Kodama | 342/70 |
| 6,828,928 B1 * | 12/2004 | Dubrovin | 342/70 |
| 2003/0122704 A1 * | 7/2003 | Dubrovin | 342/70 |

FOREIGN PATENT DOCUMENTS

JP    2000-022423    1/2000

OTHER PUBLICATIONS

Proceedings of the 2001 IEICE General Conference(Engineering Scienes), (Japan), Article No. A-17-10, p. 391.
"Monopulse Principles and Techniques" by Samuel M. Sherman, Artech House, 1st edition, Feb. 1, 1984, pp. 8-19.

* cited by examiner

*Primary Examiner*—Bernarr E. Gregory
(74) *Attorney, Agent, or Firm*—Mattingly, Stanger, Malur & Brundidge, P.C.

(57) ABSTRACT

An automotive radar which can process signals at high speed to detect a target in a wide angle range is provided. The automotive radar comprises a transmitting antenna which emits an electromagnetic wave, two receiving antennas which receive the electromagnetic wave reflected by a target, an antenna plate on which the transmitting antenna and two receiving antennas are arranged. It also includes a drive which rotates the antenna plate in an azimuth direction, which corresponds to the direction of arrangement of the two receiving antennas, to scan a detection angle formed by the two receiving antennas. The drive has rest time between scans to stop rotation. The automotive radar also includes a signal processor which detects the azimuth angle of the target with respect to a reference direction during the rest time according to received signals from the two receiving antennas and the rotation angle of the antenna plate at rest.

17 Claims, 19 Drawing Sheets

AUTOMOTIVE RADAR

CLAIM OF PRIORITY

The present patent application claims priority from Japanese application JP 2005-012460 filed on Jan. 20, 2005, the content of which is hereby incorporated by reference into this application.

FIELD OF THE INVENTION

The present invention relates to an automotive radar which is intended to be mounted in a mobile body such as a vehicle to detect the direction of a target object such as an obstacle and its distance and velocity relative to the mobile body.

BACKGROUND OF THE INVENTION

As an approach to a wide angle millimeter-wave radar, an article in the Proceedings of the 2001 IEICE General Conference (Engineering Sciences), (Japan), Article No. A-17-10, p. 391, discusses that the monopulse method is used to decrease the number of antenna elements intentionally to provide a wider angle detection range for the purpose of direction detection. The monopulse method employs a plurality of receiving antennas and determines the direction of an obstacle according to amplitude or phase difference between received signals (for example, refer to "Monopulse Principles and Techniques" authored by Samuel M. Sherman, (US), the first edition, Artech House, Feb. 1, 1984, pp. 8–19, or U.S. Pat. No. 6,243,052). Also, Japanese Patent Lid-open No. 2000-022423 discloses a mechanical scanning method in which a primary radiator of a dielectric lens antenna is moved with respect to the focal plane to scan beams.

SUMMARY OF THE INVENTION

Since millimeter-wave automotive radars are less susceptible to climate conditions (rain, mist and snow), dust and noise than ultrasonic radars or laser radars, they are considered suitable for use in vehicles as an anti-collision means or a means for adaptive cruise control. Currently available commercial millimeter-wave radars are mainly intended to be used on expressways and their detection range is approximately 16 degrees in azimuth (angle in the direction parallel to the road surface) and approximately 150 m in distance. More recently, efforts have been vigorously made to develop radars which ensure a wider detection range with an azimuth of 80 degrees or more for use in collision sensors interlocked with air bags or brakes or side sensors installed on vehicle side faces.

As one approach to a wider detection range, the monopulse method employs a plurality of receiving antennas and determines the direction of a target object such as an obstacle (hereinafter referred to as a "target") according to amplitude or phase difference between received signals. For example, as shown in FIG. 14, reflected waves 33 from a target vehicle 19 are received by two receiving antennas 34 and a sum signal 36 and a differential signal 37 are first generated in a hybrid circuit 35. FIG. 15 shows the azimuthal characteristic 38 of the sum signal and the azimuthal characteristic 39 of the differential signal; and FIG. 16 shows the azimuthal characteristic 40 as the ratio of sum signal to differential signal. In FIG. 16, the ratio of sum signal to differential signal is expressed by a monotonically decreasing function of azimuth, so that the azimuth can be uniquely determined based on the ratio of sum signal to differential signal, 40. Within an azimuth range in which a target can be identified, a plurality of targets scattered over a wide area can be detected accurately at the same time, leading to an excellent system response.

One direction detection method other than the monopulse method is a beam switch method based on a plurality of beams each of which is assigned to each direction (direction cannot be detected by a single beam) where these beams are switched. Another method is a mechanical scanning method in which a beam is mechanically swung by a motor. The beam switch method has a problem that the use of a larger number of beams entails increase in size and cost and therefore is unsuitable as a means to widen the detection range. Besides, in both methods, the direction resolution depends on beam sharpness and as the beam is sharper, the required antenna area is larger. Hence, a larger antenna must be used to achieve a higher resolution.

FIG. 17 illustrates a conventional wide-angle radar. As indicated in FIG. 17, a millimeter-wave wide-angle radar 41 is installed on the front face of a mobile body 18 and a transmitted signal is emitted toward a target vehicle 19 from an antenna with a main lobe bb. The signal reflected by the target vehicle 19 is received by a receiving antenna which has almost the same detection angle range as the main lobe bb and the velocity and distance relative to the target vehicle 19 are calculated from the difference from the transmitted signal in terms of frequency, phase and time.

In this type of millimeter-wave wide-angle radar, when the mobile body 18 is not moving, noise is small and detection performance is good. However, while the mobile body 18 is running, for example, toward the direction of arrow at velocity Vm, a nearby roadside object 20 such as a guardrail has a relative velocity and the reflected signal is thus received as a signal from an obstacle with a large scattering cross section area from position A to position B. In the monopulse method, signals from the target vehicle 19 and the roadside object 20 are simultaneously received in the main lobe bb and the signal from the target vehicle 19 might be hidden by the signal from the roadside object 20. For this reason, deterioration in distance detection accuracy or misdetection often occurred so far.

Next, an explanation will be given about how the SN ratio of a signal received by the millimeter-wave wide-angle radar deteriorates due to the abovementioned roadside object under the condition as shown in FIG. 17. For positions A and B, the respective relative velocity components V2a and V2b in the directions of positions A and B as seen from the radar 41 mounted on the mobile body 18 (angle θ2a and angle θ2b, respectively) are expressed by the following equations (1) and (2) respectively:

$$V2a = Vm \cos \theta 2a \quad (1)$$

$$V2b = Vm \cos \theta 2b \quad (2)$$

On the other hand, the relative velocity component Vtc of the target vehicle 19 in the target direction (angle θ1) is expressed by the following equation (3) where Vt represents the velocity of the target vehicle 19:

$$Vtc = (Vt - Vm) \cos \theta 1 \quad (3)$$

FIG. 18 is a spectral graph of a Doppler signal received by a radar in the monopulse method. The horizontal axis represents the relative velocity component of the target through a reflected wave and the vertical axis represents received signal intensity. Noise level Ns for a radar-mounted vehicle at a stop depends on noise 22 generated in the radar's electronic circuit. Since the level of received signal 21 from the target with relative velocity component Vtc is represented by St, the SN ratio for the radar-mounted vehicle at a stop is expressed by (St-Ns). On the other hand, when a radar-mounted vehicle is running, the level of signal 23 from the roadside object suddenly increases in the range from relative velocity component V2a to V2b. This is because the roadside object has a relative velocity during a run of the radar-mounted vehicle and a reflected wave is received as a signal. In addition, as the beam angle is widened, a rise in side lobes outside the main lobe is inevitable; therefore, there may be an unfavorable influence that the side lobes cause a rise in noise 42 in the relative velocity component range from 0 to V2a. Hence, when the radar-mounted vehicle is running, the SN ratio, which is expressed by (St-Nr), is lower than when it is not running, leading to reduction in the detection distance or misdetection.

The monopulse method is excellent in direction resolution and permits a relatively compact design. However, the antenna beam width must be increased in order to broaden the detectable direction range as mentioned above, which may result in reduction in the detectable distance range and deterioration in direction resolution.

In the mechanical scanning method as an alternative to the monopulse method, scanning is made in the beam direction and the target can be isolated in terms of time. However, for a wider scanning range, motor drive speed must be increased to achieve response time as required by the system.

In the mechanical scanning method as described in the Japanese Patent Laid-open No. 2000-22423, the primary radiator is movable with respect to the focal plane as mentioned above and scanning is made with a single relatively narrow beam as used in the monopulse method, which broadens the overall detection range and eliminates the need for a larger system. However, the beam shape changes with direction and an adjustment is necessary for each scan. Besides, since scanning is continuously made, the use of a reflected signal in the course of scanning for detection is unavoidable. Therefore, this means the need for continuous adjustments. As a consequence, the signal processing load for detection increases and the signal processing speed decreases, which might result in failure to achieve the system response indispensable for wide-angle detection.

A system which uses a monopulse type antenna for each direction and provides a wider detection range by switching these antennas was considered prior to the present invention. In this system, the beam shape does not change with direction and a stationary antenna is used for detection, which means that the signal processing load is not so significant as mentioned above and the signal processing speed is higher. As compared with the above beam switch method where direction cannot be identified by a single beam, the system based on monopulse type beams enables direction identification within the detection range and thus the required number of antennas is remarkably decreased. Nevertheless, plural antennas are needed and increase in overall size is inevitable.

An object of the present invention is to provide an automotive radar which processes signals at high speed to detect a target in a wide angle range.

In order to achieve the above object, an automotive radar comprises: a transmitting antenna which emits an electromagnetic wave; at least two receiving antennas which receive the electromagnetic wave reflected by a target; an antenna plate on which the transmitting antenna and the at least two receiving antennas are arranged; a drive which, when the direction of arrangement of the at least two receiving antennas is an azimuth direction, rotates the antenna plate in the azimuth direction to scan a detection angle formed by the at least two receiving antennas, and provides rest time between scans to stop rotation; and a signal processor which detects the azimuth angle of a target with respect to a reference direction during the rest time according to received signals from the at least two receiving antennas and the rotation angle of the antenna plate at rest.

The above automotive radar according to the present invention performs wide-angle detection by scanning a narrow detection angle. This excludes signals beyond the detection angle range. For example, right and left roadside objects can be isolated from a target on the road in terms of time. In this case, because one antenna unit incorporating transmitting and receiving antennas is rotated, the beam shape does not change with direction; in addition, there is rest time in the course of scanning and signal processing is performed during the rest time, so no adjustment is needed in signal processing. Therefore, high speed signal processing can be performed to detect a target in a wide angle range. In addition, since only one antenna unit incorporating a set of transmitting and receiving antennas is used, the system need not be large.

These and other objects and many of the attendant advantages of the invention will be readily appreciated as the same becomes better understood by reference to the following detailed description when considered in connection with the accompanying drawings.

DETAILED DESCRIPTION OF THE PREFERRED EMBODIMENTS

Figure 1:
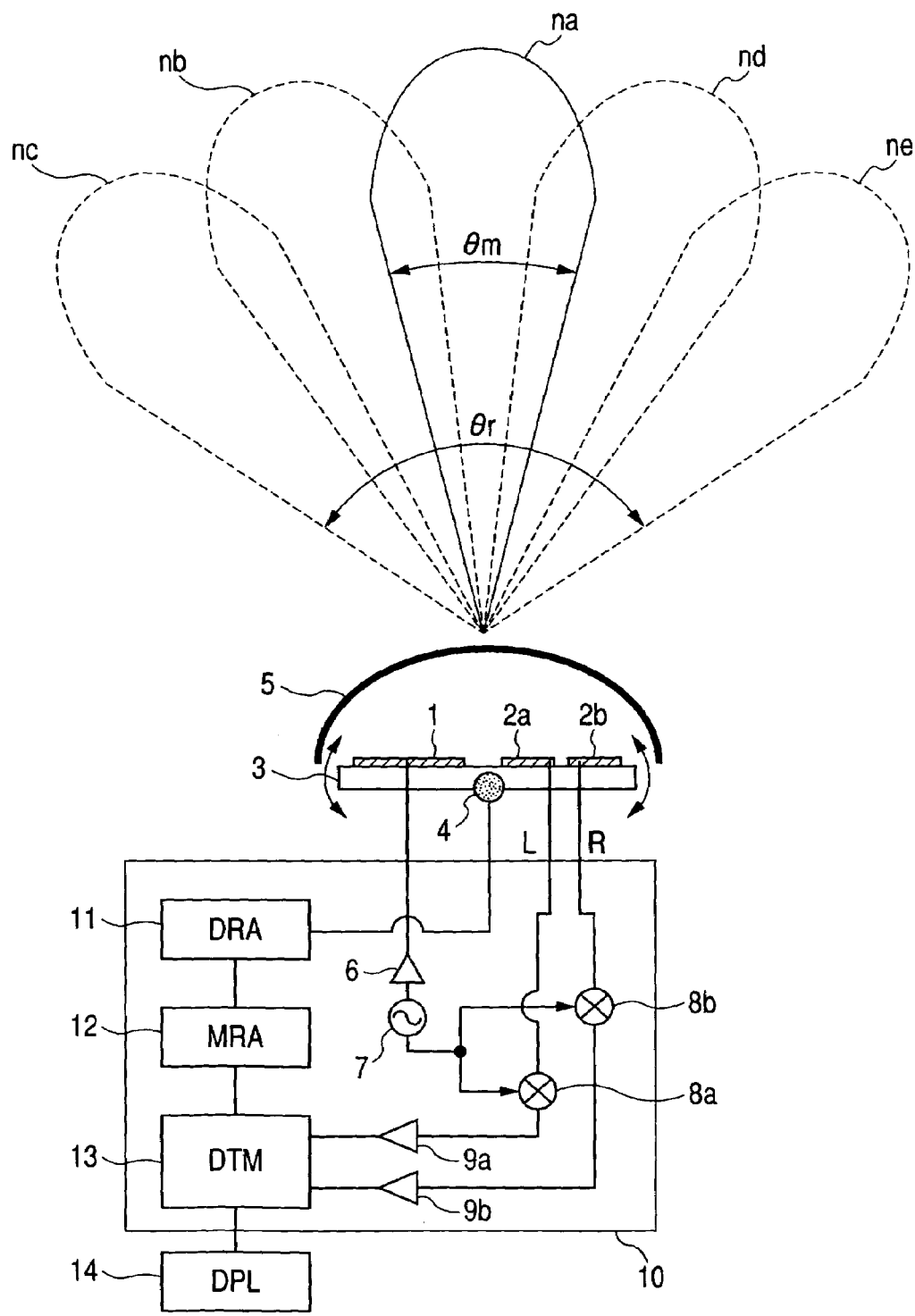
FIG. 1 is a block diagram illustrating an automotive radar according to a first embodiment of the present invention.

An automotive radar according to the present invention will be described in more detail by reference to several preferred embodiments of the present invention which are illustrated in the accompanying drawings. In all the drawings which illustrate the preferred embodiments, elements with like or similar functions are designated by like reference numerals.

FIG. 1 is a block diagram showing the first embodiment of the present invention. A transmitting array antenna (transmitting antenna) 1 and receiving array antennas (receiving antennas) 2a and 2b are arranged on an antenna plate 3. A millimeter-wave signal generated by an oscillator 7 is sent through a power amplifier 6 to the transmitting array antenna 1. A transmitted signal as an electromagnetic wave from the transmitting array antenna 1 is reflected by a target (not shown) and the reflected signal is received by the receiving array antennas 2a and 2b, which then outputs received signals L and R. The received signals L and R enter mixers 8a and 8b respectively where they are mixed with an output signal from the oscillator 7 and converted into intermediate frequency signals. The intermediate frequency signals are amplified by low-noise amplifiers 9a and 9b before entering a signal processing circuit (DTM) 13.

An azimuth motor 4 rotates the antenna plate 3 in the azimuth direction with the azimuth motor as a rotation axis within a prescribed angle range (approx. 80 degrees in the case shown in FIG. 1) to scan antenna detection angles for identifying the direction of the target in accordance with the monopulse method, in the order of na→nb→nc→nb→na→nd→ne→nd→na. In FIG. 1, θr represents a radar detection angle and θm represents an antenna detection angle.

A motor driver (DRA) 11 controls the azimuth motor 4 to stop the antenna plate 3 in detection angle positions na to ne momentarily. This rest time is determined depending on the processing capacity of the signal processing circuit 13. An antenna angle monitor (MRA) 12 monitors the rotation angle of the antenna plate 3, namely azimuth information, and sends it to the signal processing circuit 13. The azimuth information refers to a rotation angle with respect to a reference direction (direction of detection angle na in FIG. 1, or mobile body running direction when the radar is mounted on a mobile body).

While the antenna plate 3 is still, the signal processing circuit 13 detects the azimuth angle of the target using the frequency-converted signal (from the received signal) and the azimuth information of the antenna plate 3. At the same time, it detects the relative velocity of the target and distance with respect to the radar-mounted vehicle. The result of detection is converted into a signal suitable for an output device such as a display unit (DPL) 14 as necessary and sent to the output device. The power amplifier 6, oscillator 7, mixers 8a and 8b, low-noise amplifiers 9a and 9b, motor driver 11, antenna angle monitor 12 and signal processing circuit 13 constitute a transmitter-receiver 10.

The transmitting array antenna 1 and receiving array antennas 2a and 2b are covered by a domed radome 5 of dielectric material. The radome 5 does not rotate, or is fixed, and its front face is curved so that the distance between the front face and the receiving and transmitting antennas is almost constant. Due to this radome shape, during scanning, the beam shape remains virtually unchanged and is kept almost constant. The radome can be made with the same thickness on all the surfaces of the transmitting and receiving antennas. Since the radome is fixed onto the antenna plate 3, the weight of the rotating assembly increases accordingly but the beam shape is the same in all scanning positions.

Figure 2:
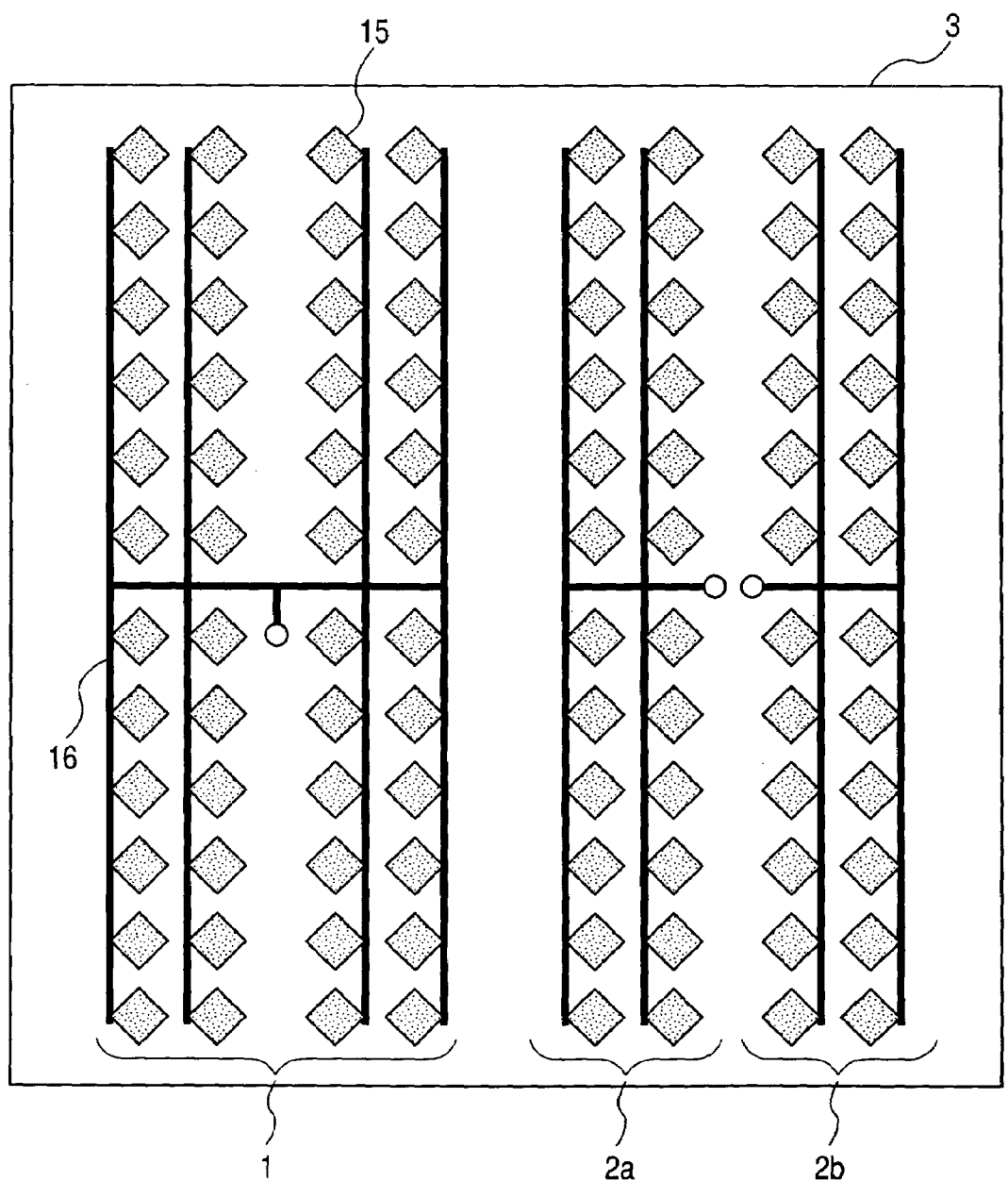
FIG. 2 is a plan view illustrating antennas used in the first embodiment.

FIG. 2 is a top view of the antennas used in this embodiment. A plurality of patch elements 15 and feeder wires 16 are formed on a dielectric substrate, constituting a transmitting antenna 1 and receiving array antennas 2a and 2b. Each array antenna lies on the antenna plate 3. The antennas used in this embodiment are of the flat type so a thinned radar is realized.

Figure 3:
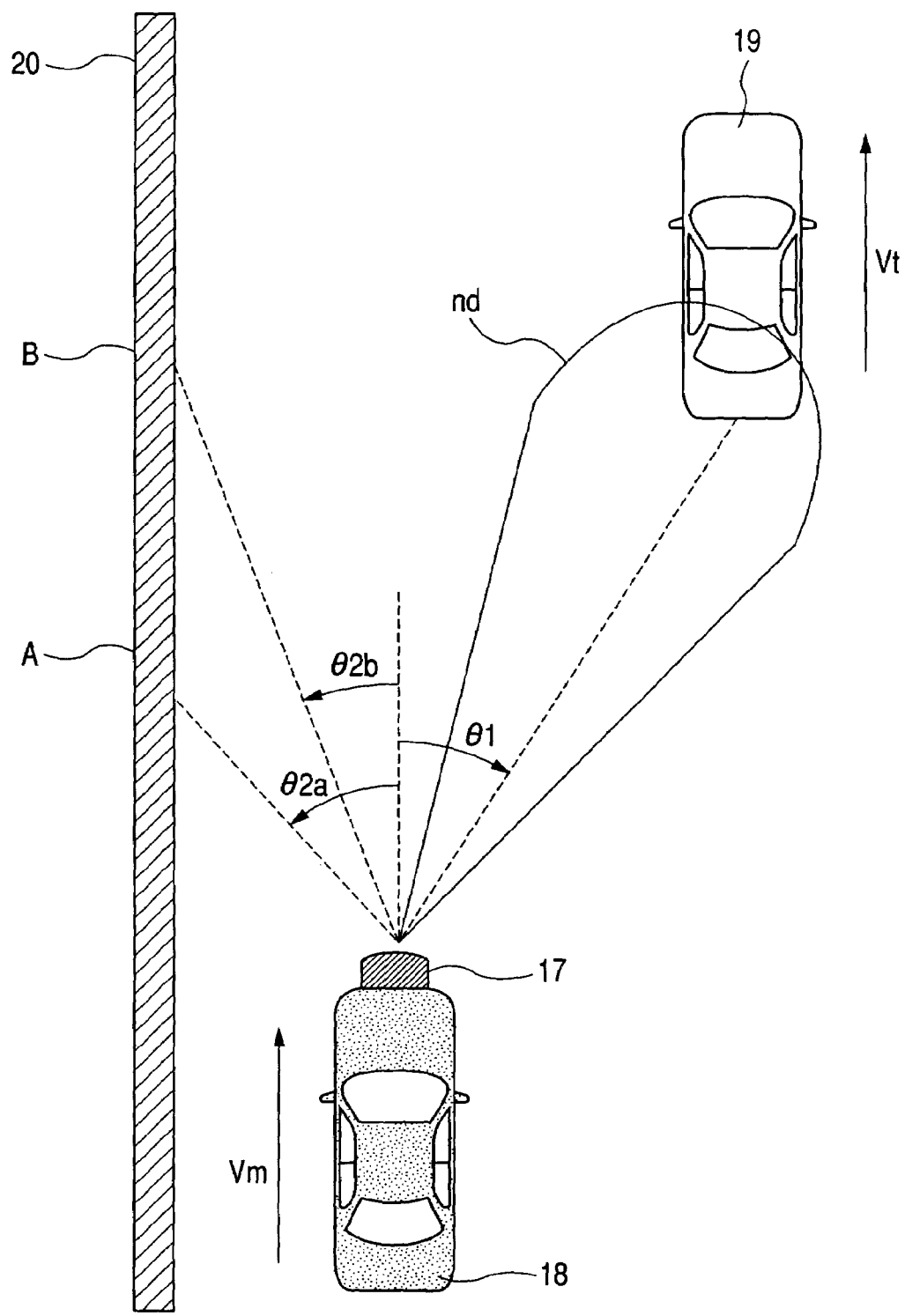
FIG. 3 is a first drawing illustrating the effect of the first embodiment.
Figure 4:
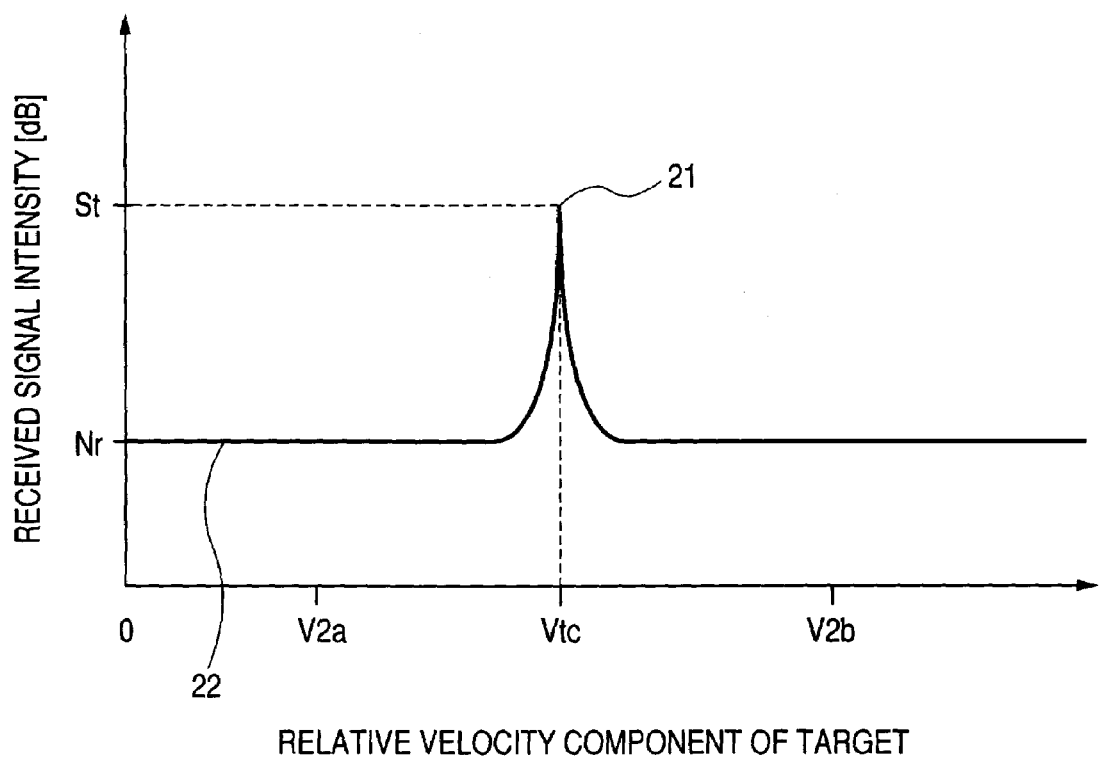
FIG. 4 is a second drawing illustrating the effect of the first embodiment.
Figure 5:
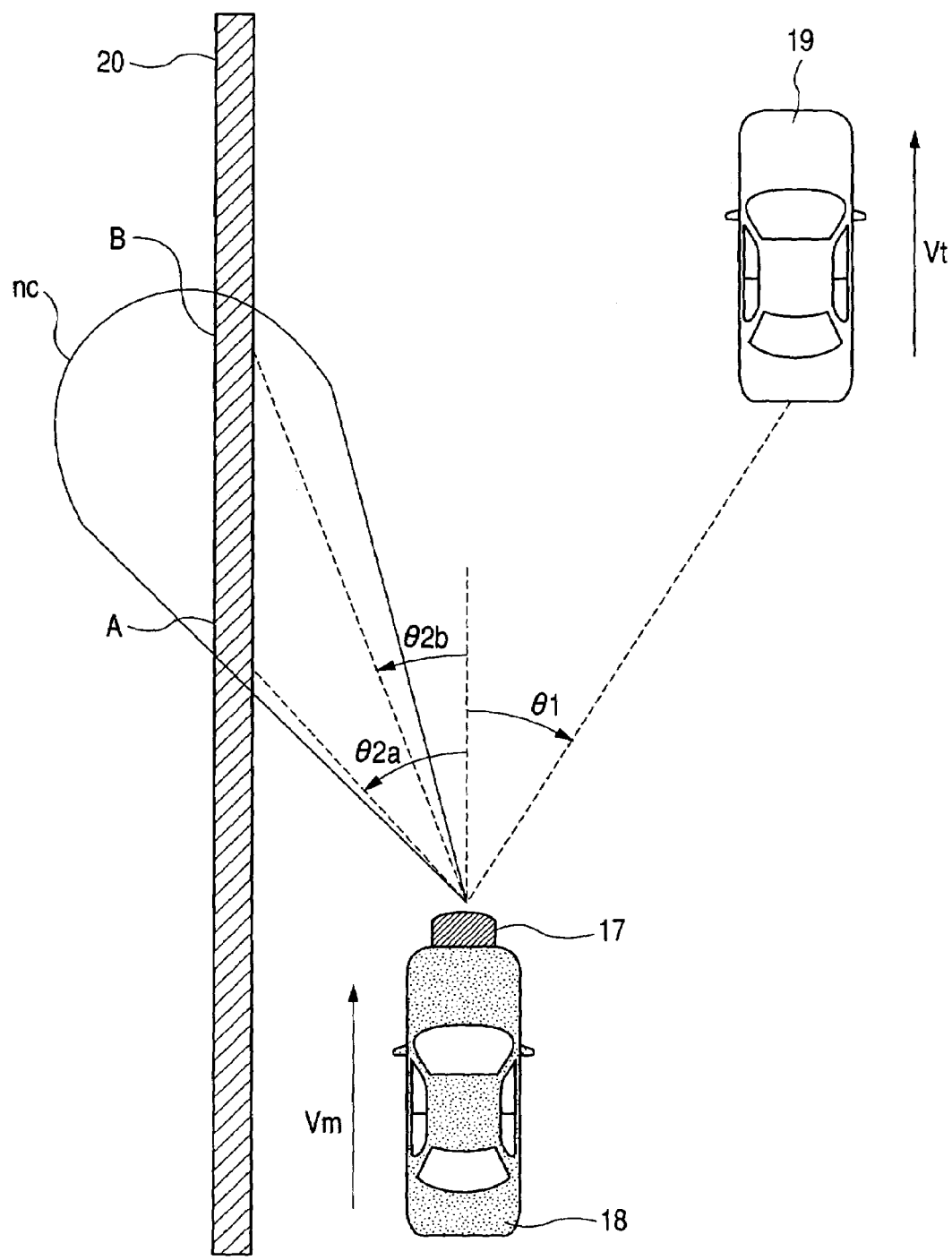
FIG. 5 is a third drawing illustrating the effect of the first embodiment.

The effect of this embodiment will be explained below referring to FIGS. 3 to 6. FIG. 3 shows that the radar 17 is installed on the front face of a mobile body 18 and detects a target vehicle 19 in the range of antenna detection angle nd at a certain time. FIG. 4 is a spectral graph concerning a Doppler signal under this condition. Here, St represents the level of a received signal 21 from the target 19 with relative velocity component Vtc. Since a signal from a roadside object 20 is not detected, noise level Nr depends on noise 22 generated in the radar's electronic circuit. Hence, SN ratio is expressed by (St-Nr).

Figure 6:
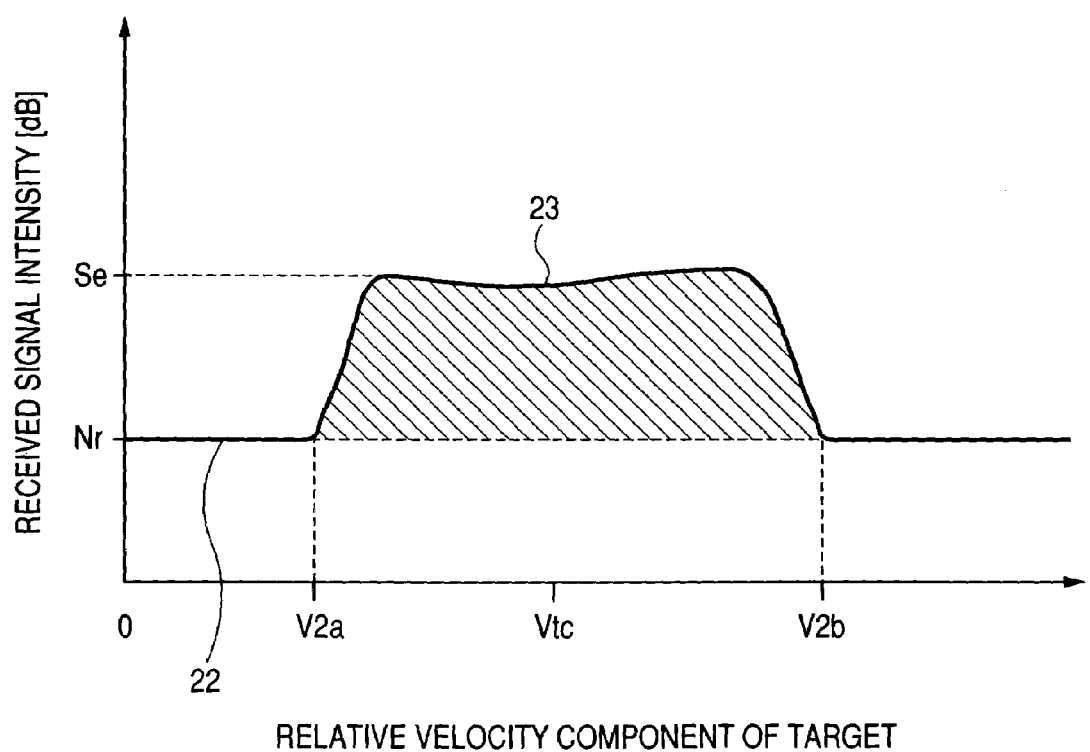
FIG. 6 is a fourth drawing illustrating the effect of the first embodiment.

On the other hand, the radar detects the roadside object 20 in the range of detection angle nc at a certain time. FIG. 6 is a spectral graph concerning a Doppler signal under this condition. A received signal 23 from the roadside object has a relative velocity component range from V2a to V2b where Se represents signal level. Due to the narrow antenna detection angle, side lobes outside the main lobe can be reduced, which prevents noise rise in the relative velocity component range from 0 to V2a. Since a signal from the target vehicle 19 is not detected, noise level Nr depends on noise 22 generated in the radar's electronic circuit. Hence, SN ratio is expressed by (Se-Nr).

As described above, the automotive radar in this embodiment performs wide-angle detection by scanning a narrow detection angle. This excludes signals beyond the detection angle range. For example, right and left roadside objects can be isolated from a target on the road in terms of time. In this case, because one antenna unit incorporating transmitting and receiving antennas is rotated, the beam shape does not change with direction; in addition, there is rest time in the course of scanning and signal processing is performed during the rest time, so that no adjustment is needed in signal processing. Therefore, high speed signal processing can be performed to detect a target in a wide angle range. In addition, since only one antenna unit incorporating a set of transmitting and receiving antennas is used as mentioned above, the system need not be large. Here, scanning is made on an antenna detection angle for identifying the direction of a target in accordance with the monopulse method. This approach permits the use of a narrower scanning range than an example of the conventional mechanical scanning system where scanning is made on a beam which cannot identify a direction. This suggests improvement in response. Furthermore, the detection angle of a single receiving antenna can be narrower than in the conventional system where the detection angle is wide and no scanning is made. This leads to improvement in distance and direction detection accuracy.

Although this embodiment employs a patch antenna, a flat antenna like a slot antenna or triplate antenna may be used instead and the use of such an antenna can also lead to a thinned radar. Also, a circulator may be used to enable one antenna to serve as both a transmitting and a receiving antenna, which can make the radar space saving. Furthermore, if components of the transmitter receiver 10 which deal with millimeter-waves, the power amplifier 6, oscillator 7, mixers 8a and 8b, and low-noise amplifiers 9a and 9b are arranged on the reverse side of the antenna plate 3, millimeter-waves can be transmitted with low loss. Also, if the system is designed to allow only the receiving array antennas 2a and 2b to rotate, high speed scanning is possible even when the azimuth motor 4 has a low torque.

If the antenna detection angle θm is increased while the radar detection angle θr is maintained, the overall rotation angle of the antenna plate 3 can be decreased, permitting higher speed scanning. Conversely, if the antenna detection angle θm is decreased, the distance detection accuracy and the direction detection accuracy can be improved. Also, if an antenna detection angle θm and a rest position are selected in a way for antenna detection angles to overlap, the accuracy of information on the target is improved and misdetection is prevented.

This embodiment can provide a driver with optimum information which he/she wishes to know, by varying the mechanical scanning range according to running conditions including the radar-mounted vehicle's velocity, its velocity relative to a target, and intervehicle distance. Specifically, if the radar-mounted vehicle runs at high speed, it is particularly important to detect a target ahead and therefore any influence of unwanted reflected waves, etc. from the vicinity of the vehicle must be prevented. For that purpose, it is effective to narrow the mechanical scanning range. Alternatively, it is effective to emphasize scanning ahead the front face of the radar-mounted vehicle by decreasing the interval between antenna detection angles ahead of the radar-mounted vehicle front face or other means. On the other hand, if the vehicle runs slowly, it is effective to widen the mechanical scanning range because a target in the vicinity of the vehicle must be detected. Alternatively, it is effective to scan over a wider range by increasing the interval between antenna detection angles ahead of the radar-mounted vehicle front face or other means. The same is true of the relative velocity and the space between the radar-mounted vehicle and the target. The steering wheel, etc. of the radar-mounted vehicle may be interlinked with switching of the mechanical scanning range.

Figure 7A:
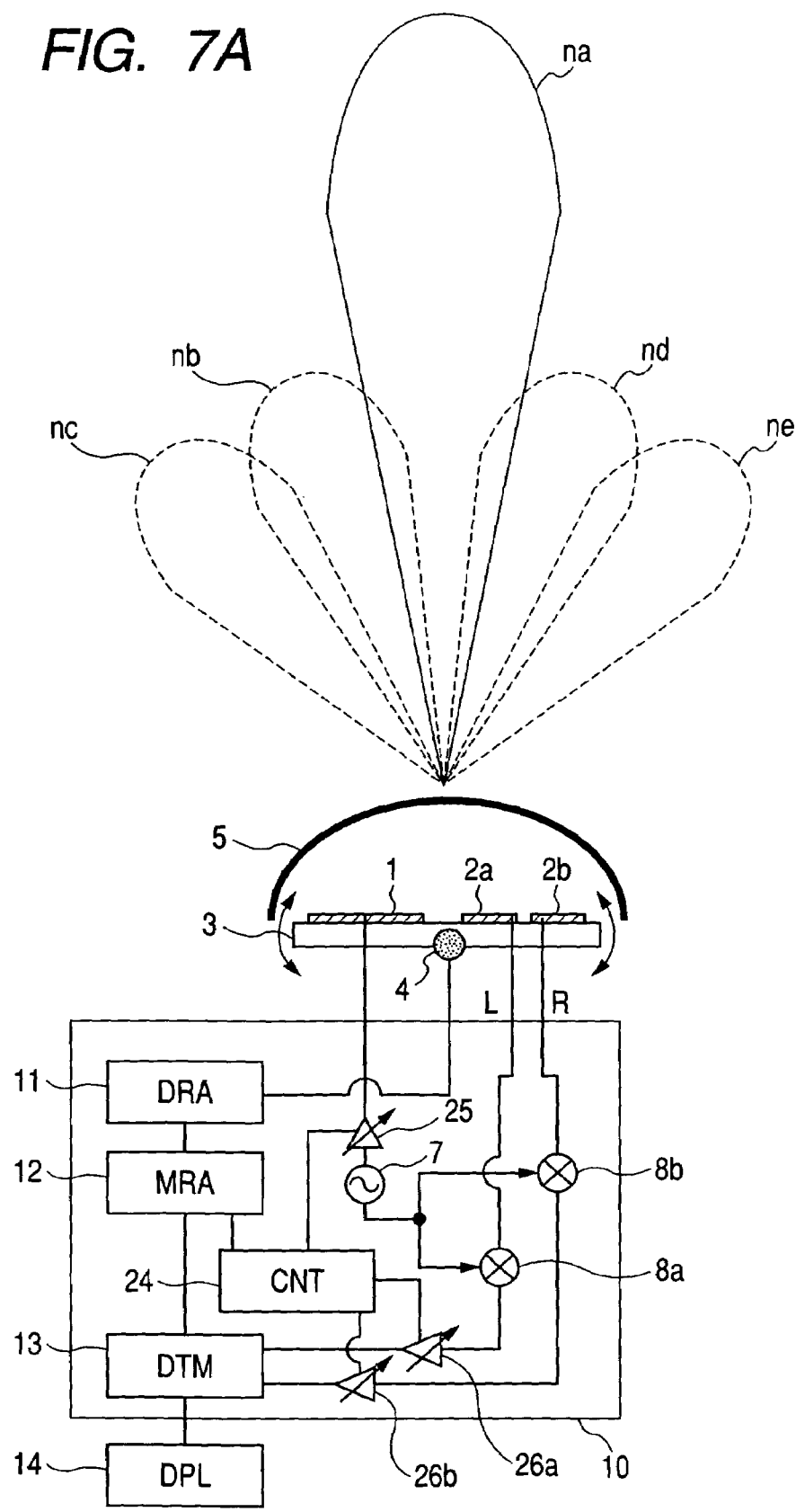
FIG. 7A is a block diagram illustrating a second embodiment of the present invention.

FIG. 7A is a block diagram showing a second embodiment of the present invention. In this embodiment, a detection distance controller (CNT) 24 which controls the detection distance at antenna angle na is provided in addition to the same components as those of the first embodiment. The transmitting array antenna 1 and receiving array antennas 2a and 2b are arranged on the antenna plate 3. A millimeter-wave signal generated by the oscillator 7 is sent through a variable gain amplifier 25 to the transmitting array antenna 1. A transmitted signal emitted from the transmitting array antenna 1 is reflected by a target and the reflected signal is received by the receiving array antennas 2a and 2b. The received signals L and R enter the mixers 8a and 8b respectively where they are mixed with an output signal from the oscillator 7 and converted into intermediate frequency signals. The intermediate frequency signals are amplified by low-noise variable gain amplifiers 26a and 26b before entering the signal processing circuit (DTM) 13. The azimuth motor 4 rotates the antenna plate 3 to scan antenna detection angles for identifying the direction of the target in accordance with the monopulse method, in the order of na→nb→nc→nb→na→nd→ne→nd→na. The motor driver 11 controls the azimuth motor 4 to stop the antenna plate 3 in detection angle positions na to ne momentarily. This rest time depends on the processing capacity of the signal processing circuit. The antenna angle monitor 12 monitors the rotation angle of the antenna plate 3, namely azimuth information, and sends it to the signal processing circuit 13.

While the antenna plate 3 is still, the signal processing circuit 13 detects the azimuth angle of the target using the frequency-converted signal (from the received signal) and the azimuth information of the antenna plate 3. At the same time, it detects the relative velocity and the distance between the radar-mounted vehicle and the target. The result of detection is converted into a signal suitable for an output device such as a display unit 14 as necessary and sent to the output device.

The detection distance controller (CNT) 24 receives an instruction signal from the antenna angle monitor 12 and increases the gain of at least either the variable gain amplifier 25 or the low noise variable gain amplifiers 26a, 26b in detection angle na than in detection angles nb to ne. This makes it possible to detect a remote target. The transmitting array antenna 1 and receiving array antennas 2a and 2b are covered by a radome 5 of dielectric material.

In this embodiment, since a remoter target can be detected in frontal detection angle na than in the other detection angles nb tone, it is possible to provide a low-cost radar which combines a narrow-angle long-distance detection function and a wide-angle short-distance detection function. As in the first embodiment, the automotive radar in the second embodiment performs wide-angle detection by scanning a narrow detection angle. This excludes signals beyond the detection angle range. For example, right and left roadside objects can be isolated from the target on the road in terms of time. In this case, because one antenna unit incorporating transmitting and receiving antennas is rotated, the beam shape does not change with direction; in addition, there is rest time in the course of scanning and signal processing is performed during the rest time, so that no adjustment is needed in signal processing. Therefore, high speed signal processing can be performed to detect a target in a wide angle range. In addition, since only one antenna incorporating a set of transmitting and receiving antennas is used as mentioned above, the system need not be large. Here, scanning is done for an antenna detection angle for identifying the direction of a target in accordance with the monopulse method. This approach permits the use of a narrower scanning range than an example of the conventional mechanical scanning system where scanning is made on a beam which cannot identify a direction. This suggests improvement in response. Furthermore, the detection angle of a single receiving antenna can be narrower than in the conventional system where the detection angle is wide and no scanning is made. This leads to improvement in distance and direction detection accuracy.

Figure 7B:
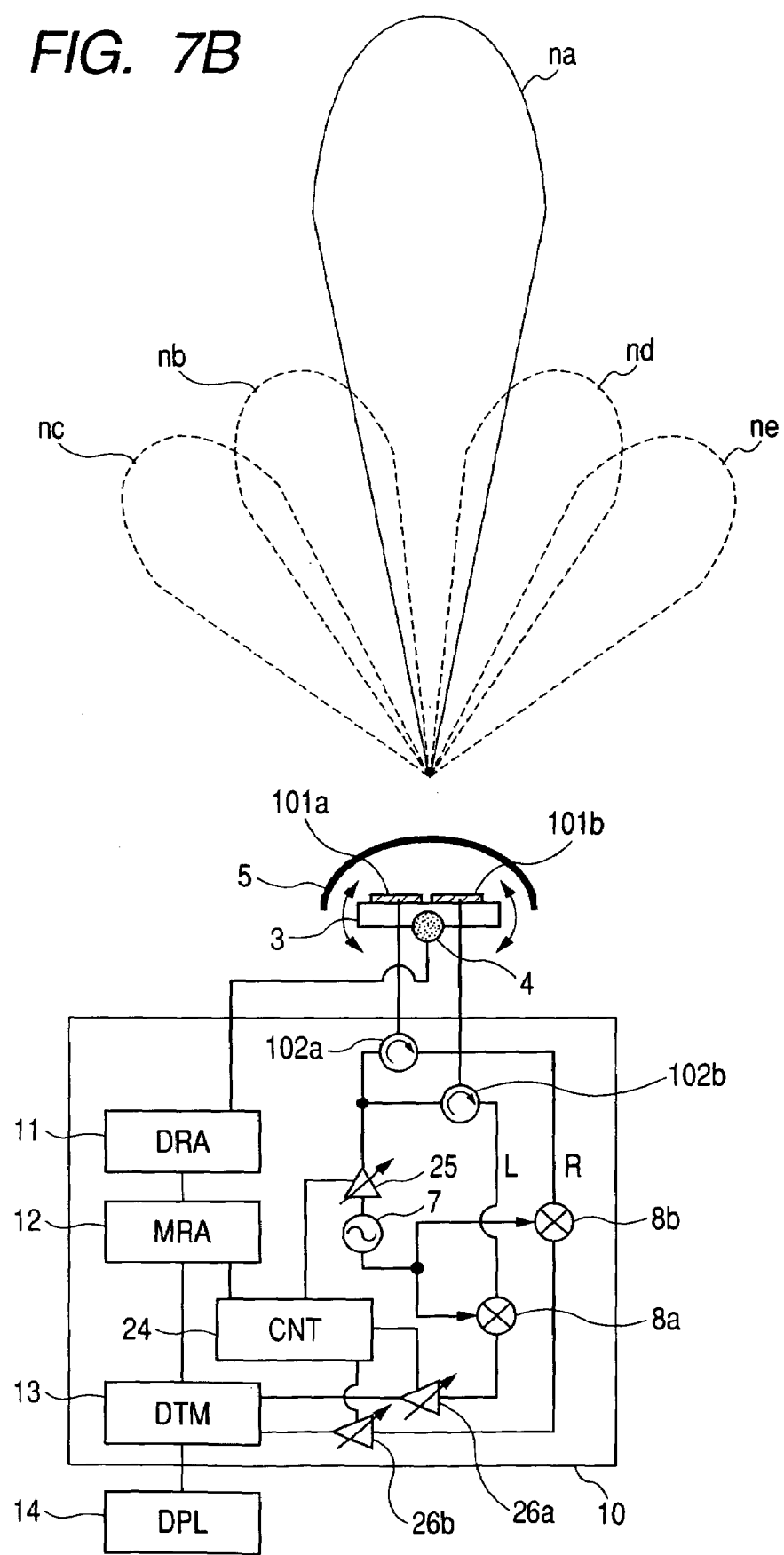
FIG. 7B is another block diagram illustrating the second embodiment.

FIG. 7B shows that each common antenna serves as both a transmitting antenna and a receiving antenna through the use of a circulator according to this embodiment. In FIG. 7B, 101a and 101b represent common antennas which each serve as both a transmitting antenna and a receiving antenna; 102a and 102b represent circulators which are connected with the common antennas 101a and 101b respectively. The circulators 102a and 102b switch the transmission mode to the reception mode and vice versa. The use of such dual-purpose common antennas permits a space-saving radar design. Such dual-purpose common antennas may also be used similarly in other embodiments.

Figure 8:
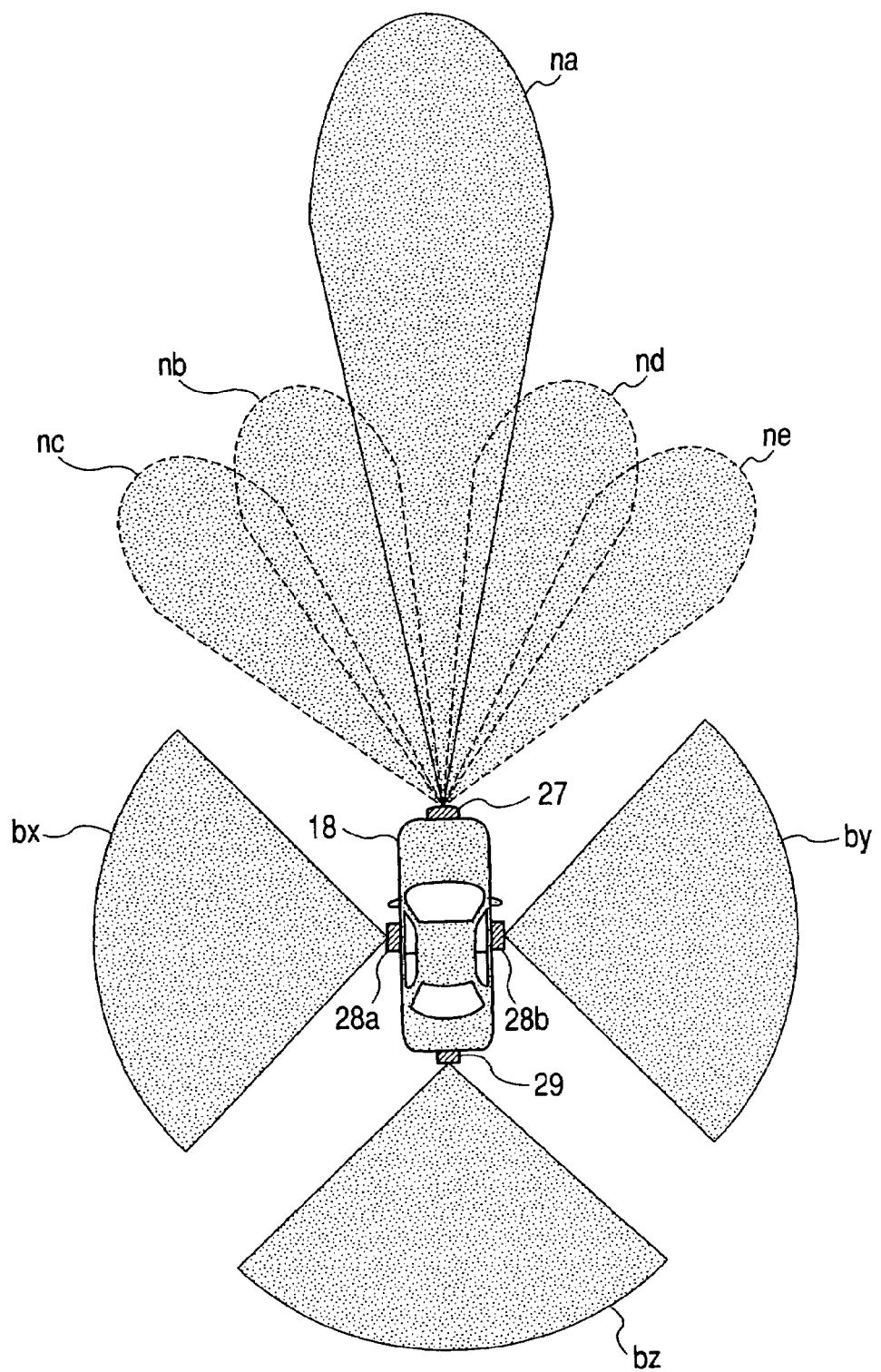
FIG. 8 illustrates an application example of the second embodiment.

FIG. 8 illustrates an application example of this embodiment. For increased safety of automobiles, it is expected that a plurality of radars will be mounted in one vehicle in the future. In this connection, it is generally thought that a narrow-angle/long-distance radar for adaptive cruise control (ACC) should be mounted on the front face of the vehicle and wide-angle/short-distance radars for collision detection should be mounted on the front, side and rear faces of the vehicle. However, the use of several radars leads to a higher cost. Hence there is demand for a low cost radar system which combines a narrow-angle/long-distance detection function and a wide-angle/short-distance detection function. The application example as shown in FIG. 8 is designed to meet this demand. A radar 27 is mounted on the front face of the mobile body 18 so as to cover a long distance in the frontal direction and short distances in oblique directions ahead. In addition, side sensors 28a and 28b as conventional wide-angle radars are mounted on side faces of the mobile body 18 with wide-angle/short-distance detection ranges bx and by respectively. Also, a rear sensor 29 is mounted on the back of the mobile body 18 with a wide-angle/short-distance detection range bz. The consequence is a low cost radar system that performs 360-degree detection around the mobile body with a minimal number of radars for increased safety.

Figure 9:
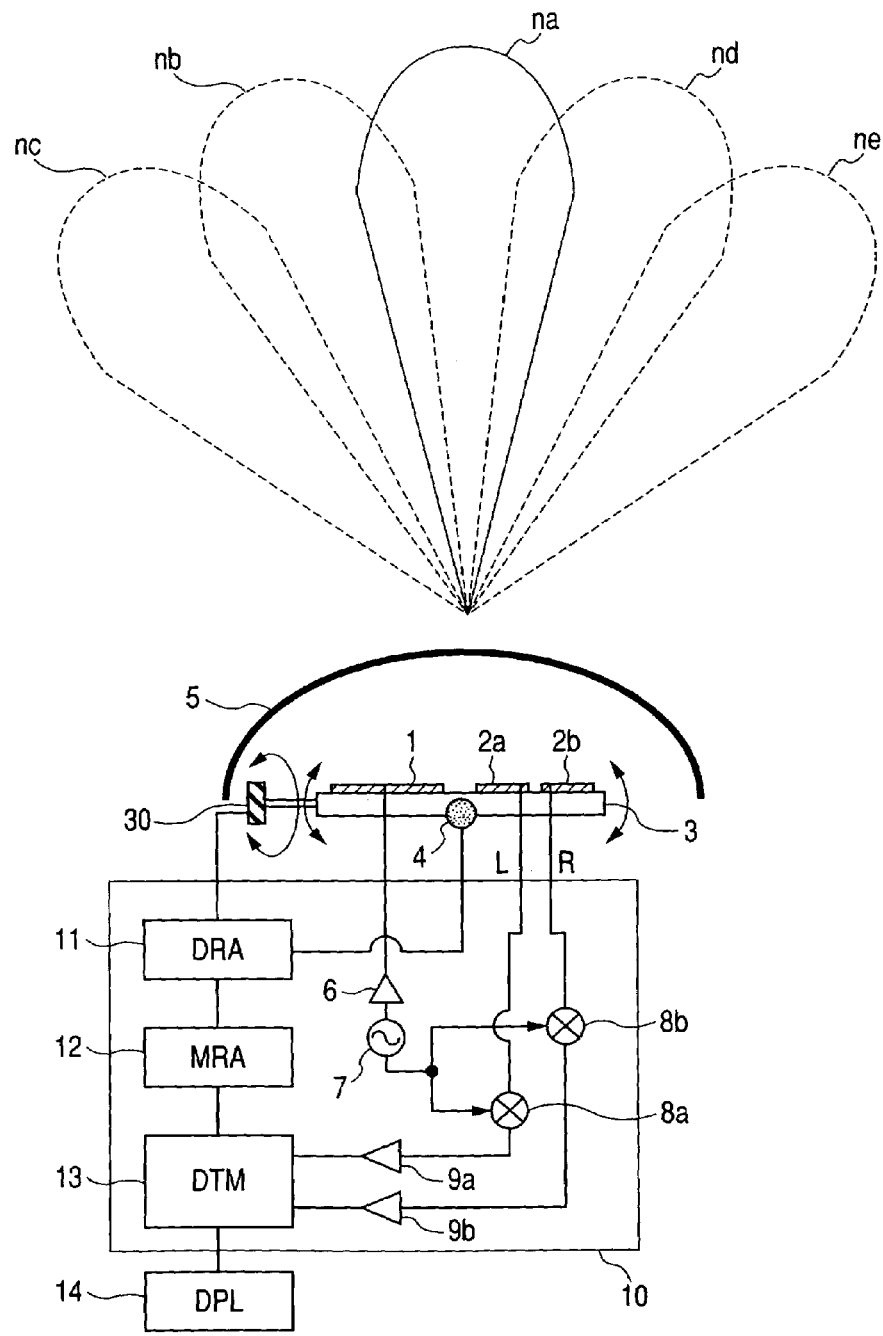
FIG. 9 is a block diagram illustrating a third embodiment of the present invention.

FIG. 9 is a block diagram showing a third embodiment of the present invention. In this embodiment, an elevation angle motor 30 which rotates an antenna in the direction of elevation angle (angle perpendicular to the road surface) is provided in addition to the same components as those of the first embodiment. The transmitting array antenna 1 and receiving array antennas 2a and 2b are arranged on the antenna plate 3. A millimeter-wave signal generated by the oscillator 7 is sent through the power amplifier 6 to the transmitting array antenna 1. A signal emitted from the transmitting array antenna 1 is reflected by the target and the reflected signal is received by the receiving array antennas 2a and 2b. The received signals L and R enter the mixers 8a and 8b respectively where they are mixed with an output signal from the oscillator 7 and converted 25 into intermediate frequency signals. The intermediate frequency signals are amplified by the low-noise amplifiers 9a and 9b before entering the signal processing circuit (DTM) 13. The azimuth motor 4 rotates the antenna plate 3 to scan antenna detection angles for identifying the direction of the target in accordance with the monopulse method, in the order of na→nb→nc→nb→na→nd→ne→nd→na.

The elevation angle motor 30 rotates the antenna plate 3 in the direction of elevation angle. The motor driver 11 controls the azimuth motor 4 and the elevation angle motor 30 to stop rotation of the antenna plate 3 in the azimuth and elevation angle directions momentarily. This rest time is determined depending on the processing capacity of the signal processing circuit and signal processing is performed while scanning is made neither in the azimuth direction nor in the elevation angle direction.

The antenna angle monitor 12 monitors the azimuth angle and elevation angle of the antenna plate 3 and sends azimuth and elevation angle information to the signal processing circuit 13. While the antenna plate 3 is still, the signal processing circuit 13 detects the position of the target using the frequency-converted signal (from the received signal) and the azimuth and elevation angle information of the antenna plate 3. At the same time, it detects the relative velocity and the distance between the radar-mounted vehicle and the target. The result of detection is converted into a signal suitable for an output device such as a display unit 14 as necessary and sent to the output device. The transmitting array antenna 1 and receiving array antennas 2a and 2b are covered by a radome 5 of dielectric material.

Figure 10:
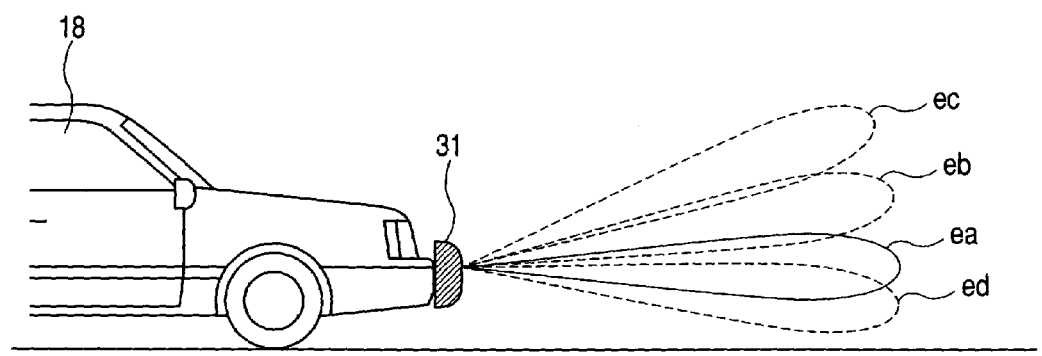
FIG. 10 illustrates scanning in the direction of elevation angle in the third embodiment.

FIG. 10 illustrates how scanning in the direction of elevation angle is made according to this embodiment. The radar 31 is mounted on the front face of the mobile body 18. The elevation angle motor 30 rotates the antenna plate 3 to scan antenna detection angles for identifying the direction of the target in accordance with the monopulse method, in the order of ea→eb→ec→eb→ea→ed→ea.

Therefore, according to this embodiment, a target can be isolated in the height direction easily, so that a tunnel or an iron bridge can be recognized. Even when the vehicle is running on a sloping road, the system does not fail to detect a target.

As in the first embodiment, the automotive radar in this embodiment performs wide-angle detection by scanning a narrow detection angle. This excludes signals beyond the detection angle range. For example, right and left roadside objects can be isolated from a target on the road in terms of time. In this case, because one antenna unit incorporating transmitting and receiving antennas is rotated, the beam shape does not change with direction; in addition, there is rest time in the course of scanning and signal processing is performed during the rest time, so that no adjustment is needed in signal processing. Therefore, high speed signal processing can be performed to detect a target in a wide angle range. In addition, since only one antenna unit incorporating a set of transmitting and receiving antennas is used as mentioned above, the system need not be large. Here, scanning is made on an antenna detection angle for identifying the direction of a target in accordance with the monopulse method. This approach permits the use of a narrower scanning range than an example of the conventional mechanical scanning system where scanning is made on a beam which cannot identify a direction. This suggests improvement in response. Furthermore, the detection angle of a single receiving antenna can be narrower than in the conventional system where the detection angle is wide and no scanning is made. This leads to improvement in distance and direction detection accuracy.

Depending on the application purpose of an automotive radar, detection in the elevation angle direction may be more important though scanning in the azimuth direction is possible. In such an automotive radar, the azimuth motor 4 may be omitted.

Figure 11:
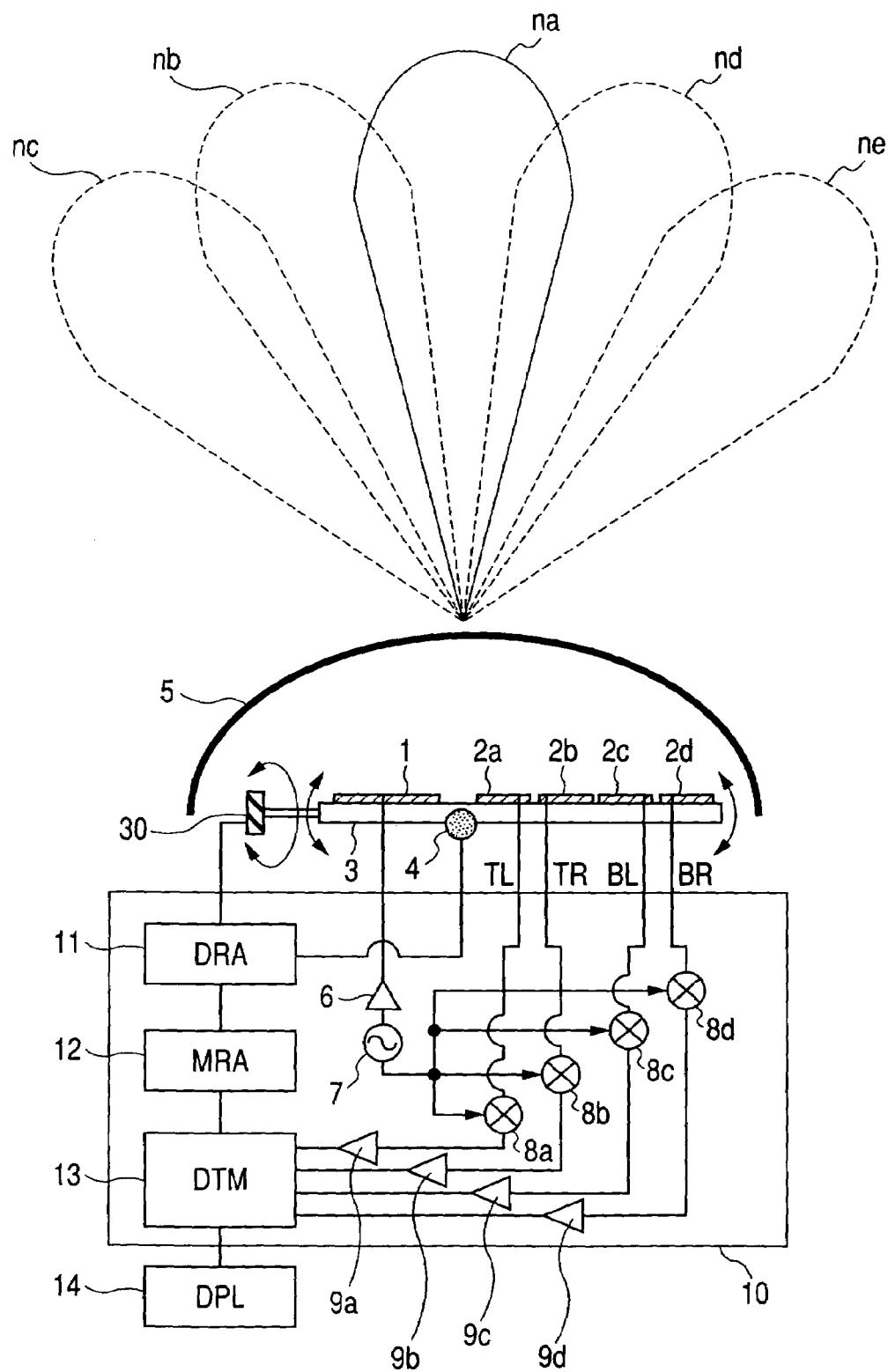
FIG. 11 is a block diagram illustrating a fourth embodiment of the present invention.

FIG. 11 is a block diagram showing a fourth embodiment of the present invention. In this embodiment, receiving array antennas 2c and 2d and various circuits connected with them are provided in addition to the same components as those of the third embodiment. The transmitting array antenna 1 and receiving array antennas 2a to 2d are arranged on the antenna plate 3. A millimeter-wave signal generated by the oscillator 7 is sent through the power amplifier 6 to the transmitting array antenna 1. A signal emitted from the transmitting array antenna 1 is reflected by a target and the reflected signal is received by the receiving array antennas 2a to 2d. The receiving array antennas 2a to 2d output received signals TL, TR, BL and BR respectively. The received signals TL, TR, BL and BR enter the mixers 8a to 8d respectively where they are mixed with an output signal from the oscillator 7 and converted into intermediate frequency signals. The intermediate frequency signals are amplified by the low-noise amplifiers 9a to 9d before entering the signal processing circuit 13.

Figure 12:
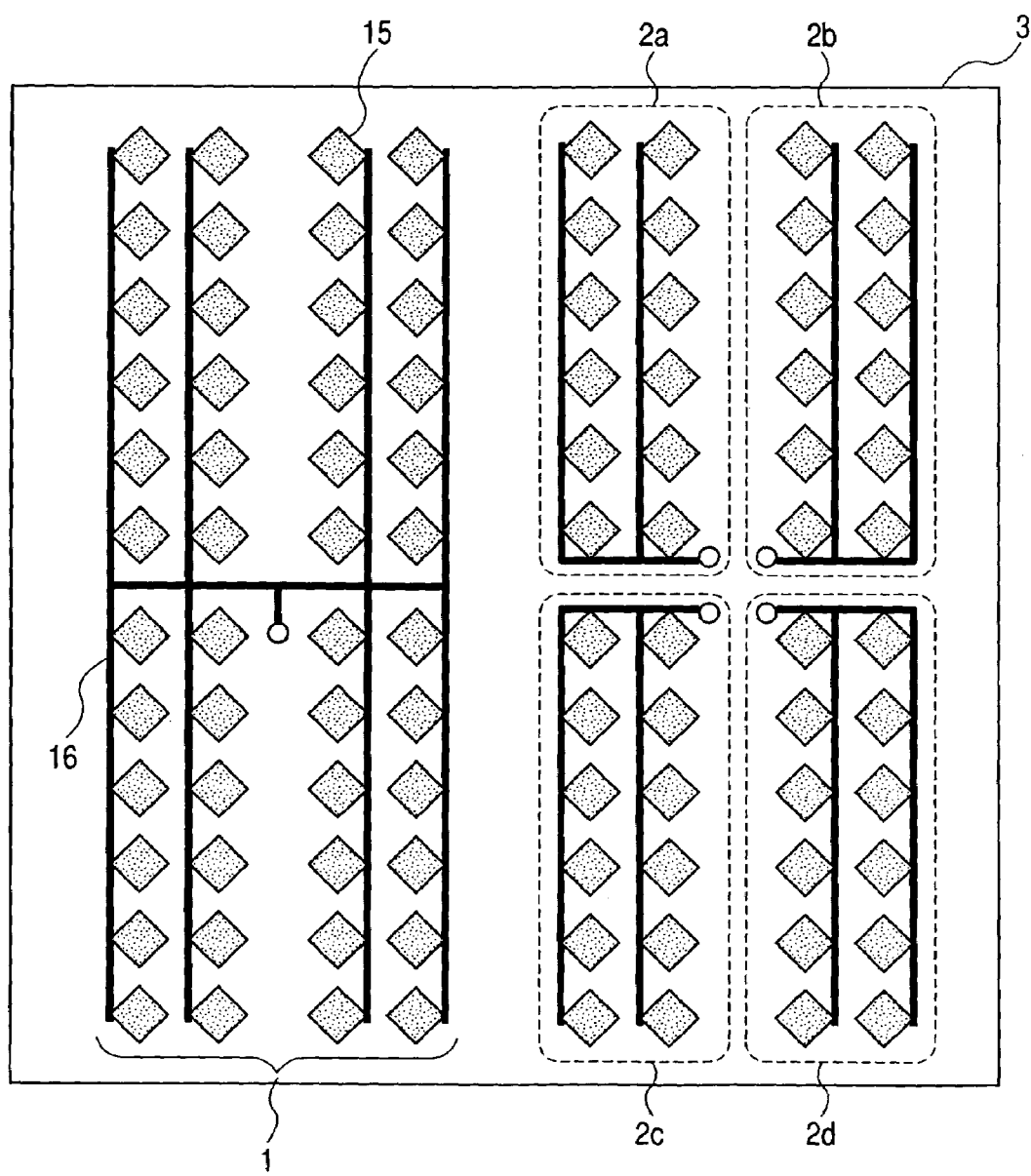
FIG. 12 is a plan view illustrating antennas used in the fourth embodiment.

FIG. 12 is a top view of antennas used in this embodiment. A plurality of patch elements 15 and feeder wires 16 are formed on a dielectric substrate, constituting a transmitting array antenna 1 and receiving array antennas 2a to 2d. The four receiving antennas 2a to 2d are adjacent to each other horizontally and vertically. The array antennas lie on the antenna plate 3. The antennas used in this embodiment are of the flat type so a thinned radar is realized.

The azimuth angle of the target with respect to the frontal direction of the antenna plate 3 can be identified according to amplitude or phase difference in received signals TL and TR from the antennas 2a and 2b, aligned horizontally in FIG. 12. Needless to say, it is possible to identify the azimuth angle of the target by comparison between received signals BL and BR or by comparison between the sums of received signals (TL+BL) and (TR+BR). The elevation angle of the target with respect to the frontal direction of the antenna plate 3 can be identified according to amplitude or phase difference in received signals TL and BL from the antennas 2a and 2c, aligned vertically. Likewise, the elevation angle of the target can be identified by comparison between received signals TR and BR or by comparison between the sums of received signals (TL+BL) and (TR+BR).

The azimuth motor 4 rotates the antenna plate 3 to scan antenna detection angles for identifying the direction of the target in accordance with the monopulse method, in the order of na→nb→nc→nb→na→nd→ne→nd→na. The elevation angle motor 30 rotates the antenna plate 3 in the direction of elevation angle. The motor driver 11 controls the azimuth motor 4 and the elevation angle motor 30 to stop rotation of the antenna plate 3 in each antenna azimuth position momentarily. This rest time depends on the processing capacity of the signal processing circuit.

The antenna angle monitor 12 monitors the azimuth angle and elevation angle of the antenna plate 3 and sends azimuth and elevation angle information to the signal processing circuit 13. While the antenna plate 3 is still, the signal processing circuit 13 detects the position of the target using the frequency-converted signal (from the received signal) and the azimuth and elevation angle information of the antenna plate 3. At the same time, it detects the relative velocity and the distance between the radar-mounted vehicle and the target. The result of detection is converted into a signal suitable for an output device such as a display unit 14 as necessary and sent to the output device. The transmitting array antenna 1 and receiving array antennas 2a and 2b are covered by a radome 5 of dielectric material.

Figure 13:
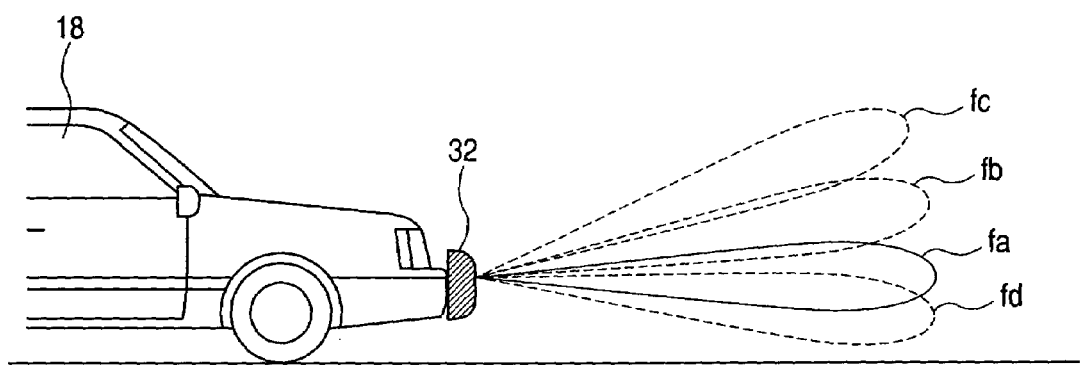
FIG. 13 illustrates scanning in the direction of elevation angle in the fourth embodiment.
Figure 14:
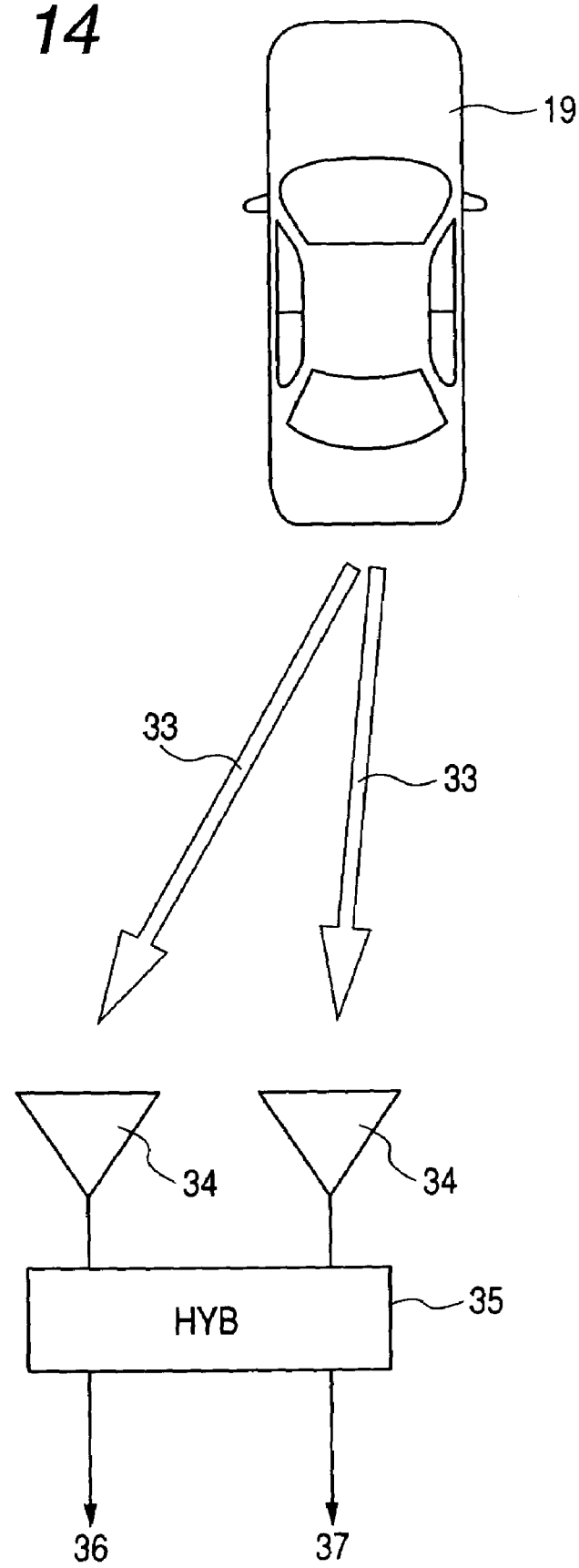
FIG. 14 illustrates the monopulse method.
Figure 15:
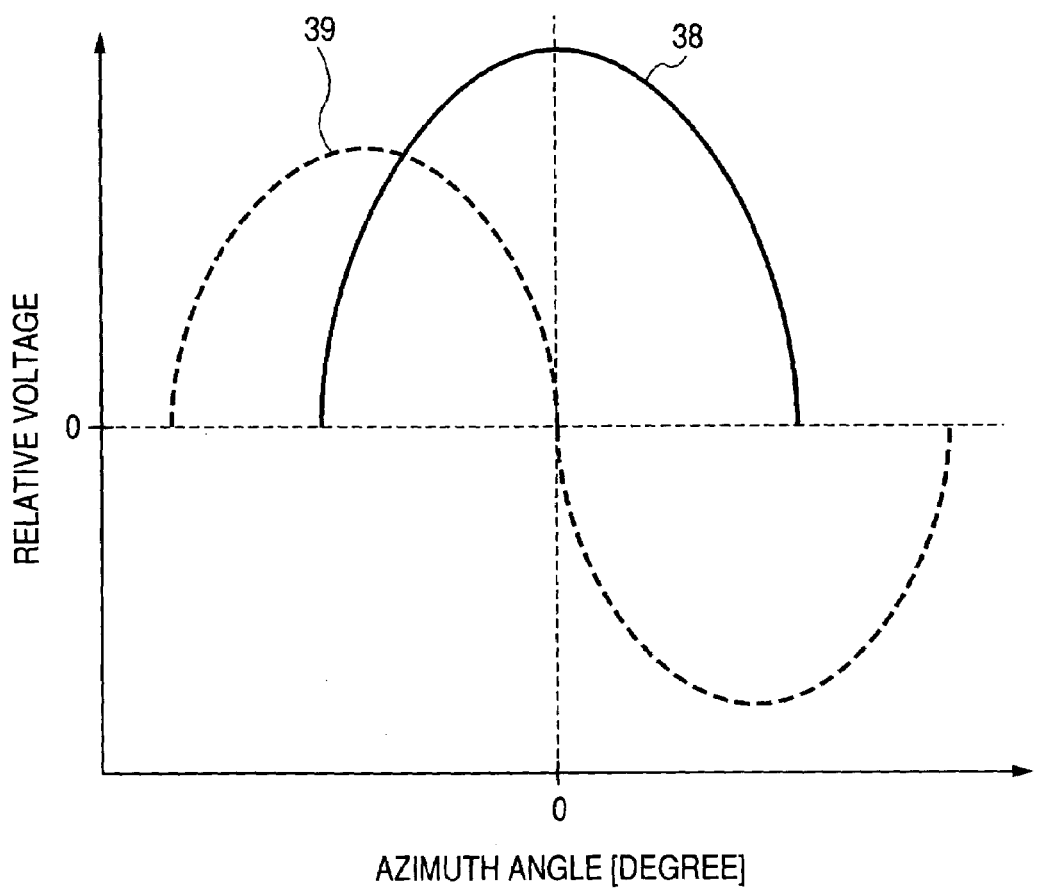
FIG. 15 is a graph showing curves concerning a sum signal and a differential signal in the monopulse method.
Figure 16:
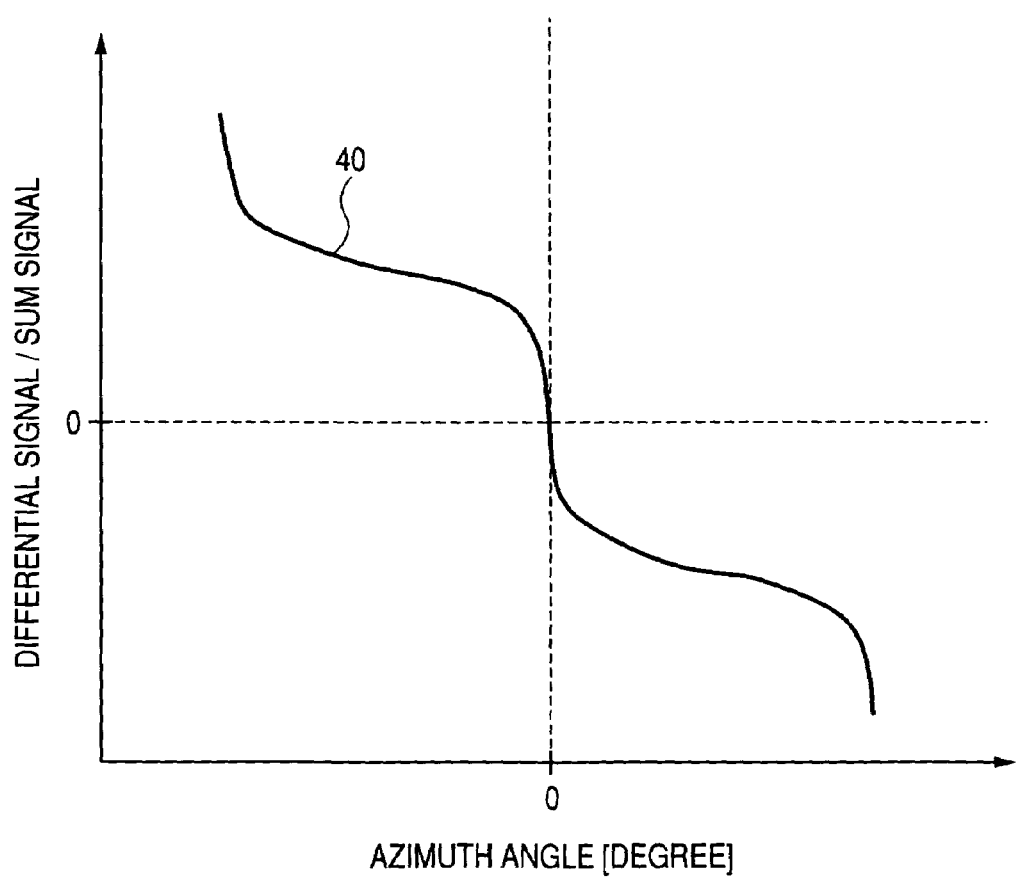
FIG. 16 is a graph showing a curve concerning the ratio of sum signal to differential signal.
Figure 17:
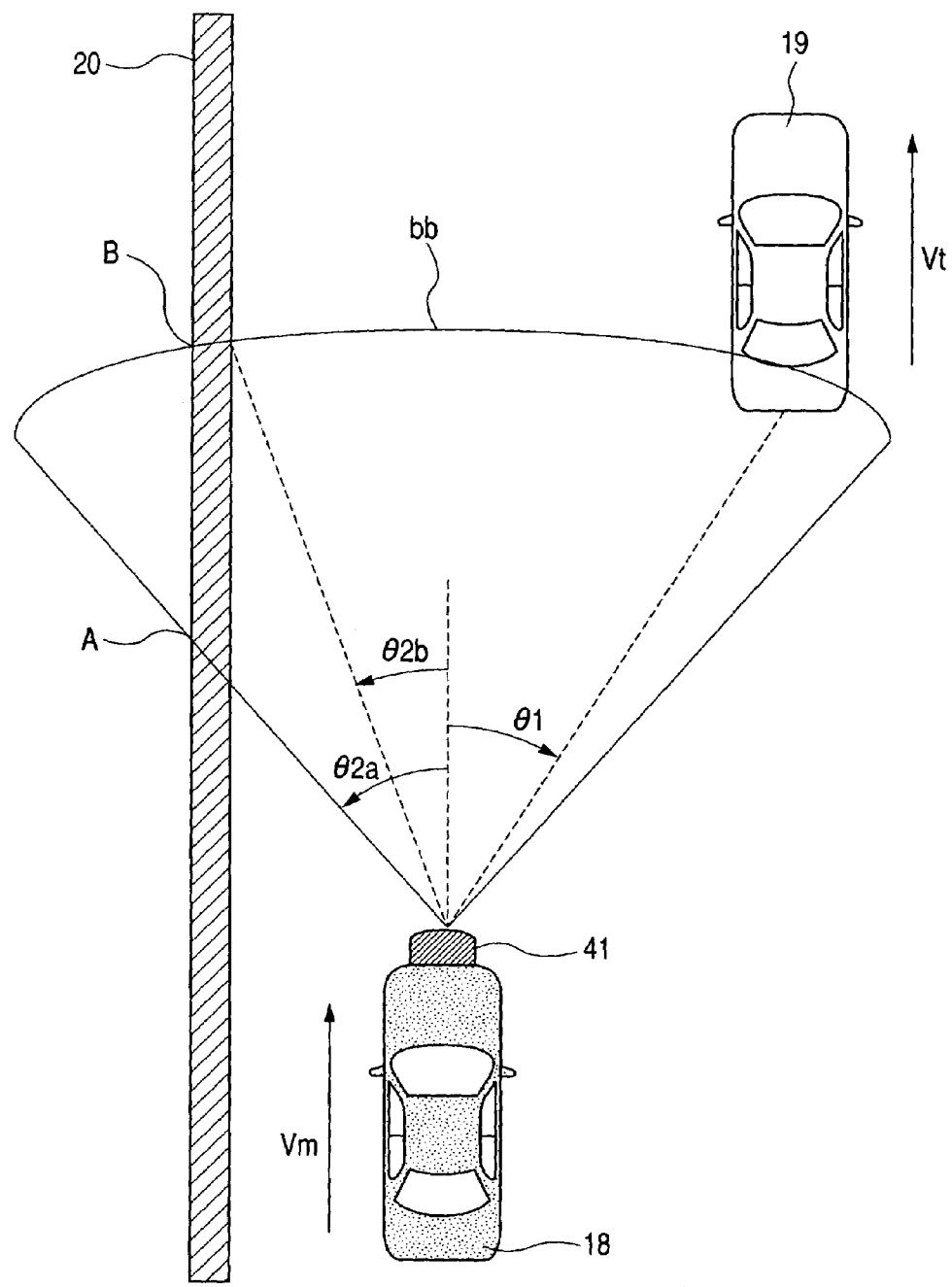
FIG. 17 illustrates the conventional automotive radar.
Figure 18:
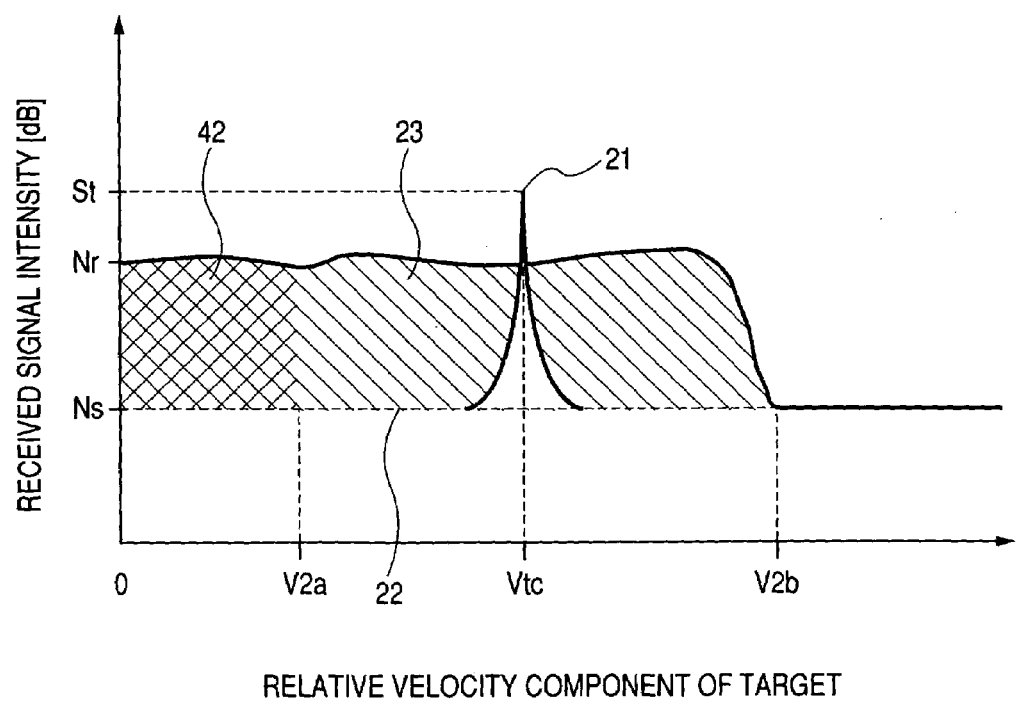
FIG. 18 is a graph illustrating the conventional automotive radar.

FIG. 13 illustrates how scanning in the direction of elevation angle is made according to this embodiment. The radar 31 is mounted on the front face of the mobile body 18. The elevation angle motor rotates the antenna plate to scan antenna detection angles for identifying the azimuth and elevation angles of the target in accordance with the monopulse method, in the order of fa→fb→fc→fb→fa→fd→fa. Therefore, according to this embodiment, a target can be isolated in the height direction accurately, so that a tunnel or an iron bridge can be recognized. Even when the vehicle is running on a sloping road, the system does not fail to detect a target.

As in the third embodiment, the automotive radar in this embodiment performs wide-angle detection by scanning a narrow detection angle. This excludes signals beyond the detection angle range. For example, right and left roadside objects can be isolated from a target on the road in terms of time. In this case, because one antenna unit incorporating transmitting and receiving antennas is rotated, the beam shape does not change with direction; in addition, there is rest time in the course of scanning, and signal processing is performed during the rest time, so that no adjustment is needed in signal processing. Therefore, high speed signal processing can be performed to detect a target in a wide angle range. In addition, since only one antenna unit incorporating a set of transmitting and receiving antennas is used as mentioned above, the system need not be large. Here, scanning is made on an antenna detection angle for identifying the direction of a target in accordance with the monopulse method. This approach permits the use of a narrower scanning range than an example of the conventional mechanical scanning system where scanning is made on a beam which cannot identify a direction. This suggests improvement in response. Furthermore, the detection angle of a single receiving antenna can be narrower than in the conventional system where the detection angle is wide and no scanning is made. This leads to improvement in distance and direction detection accuracy.

Although this embodiment employs a patch antenna, a flat antenna like a slot antenna or triplate antenna may be used instead and the use of such an antenna can also lead to a thinned radar.

According to the present invention, in scanning a narrow detection angle for wide-angle detection, a single antenna unit is rotated and there is rest time during scanning so that no adjustment is necessary in signal processing and therefore high speed signal processing can be performed to detect a target in a wide angle range.

It is further understood by those skilled in the art that the foregoing description concerns preferred embodiments of the disclosed device and that various changes and modifications may be made in the invention without departing from the spirit and scope thereof.

What is claimed is:

1. An automotive radar comprising:
   a transmitting antenna which emits an electromagnetic wave;
   at least two receiving antennas which receive said electromagnetic wave reflected by a target;
   an antenna substrate on which said transmitting antenna and said at least two receiving antennas are arranged;
   a drive which, when the direction of arrangement of said at least two receiving antennas is an azimuth direction, rotates said antenna substrate in said azimuth direction to perform plural scans each from one antenna detection angle to an adjacent antenna detection angle of a plurality of antenna detection angles each formed by said at least two receiving antennas, and provides each stopping point of said antenna substrate between a scan and a next scan; and
   a signal processor which detects the azimuth angle of a target with respect to a reference direction during said stopping point according to received signals from said at least two receiving antennas and the rotation angle of said antenna substrate at the stopping point.

2. The automotive radar according to claim 1, wherein said azimuth angle is detected from comparison of difference in amplitude or phase between received signals from said at least two receiving antennas.

3. The automotive radar according to claim 1, wherein said at least two receiving antennas serve also as the transmitting antenna.

4. The automotive radar according to claim 1, wherein a detection range is formed with said antenna detection angle, and said detection range at the stopping point partially overlaps with a detection range at the stopping point after the next scan.

5. The automotive radar according to claim 1, wherein said drive changes said scanning range to another scanning range.

6. The automotive radar according to claim 1, further comprising a radome covering said transmitting antenna and said at least two receiving antennas, wherein said radome contains a dielectric material and the upper face of said radome is curved in a scanning direction.

7. The automotive radar according to claim 1, wherein the intensity of an electromagnetic wave emitted from said transmitting antenna varies depending on a rotation angle at the stopping point.

8. The automotive radar according to claim 1, wherein said signal processor changes the level of said received signals depending on a rotation angle at the stopping point to detect said azimuth angle.

9. An automotive radar comprising:
- a transmitting antenna which emits an electromagnetic wave;
- at least two receiving antennas which receive said electromagnetic wave reflected by a target;
- an antenna substrate on which said transmitting antenna and said at least two receiving antennas are arranged;
- a drive which, when the direction of arrangement of said at least two receiving antennas is an azimuth direction, rotates said antenna substrate in an elevation angle direction perpendicular to said azimuth direction to perform plural scans, in the elevation angle direction, each from one first antenna detection angle to an adjacent first antenna detection angle of a plurality of first antenna detection angles formed by said at least two receiving antennas, and provides each stopping point of said antenna substrate between a scan and a next scan; and
- a signal processor which detects the azimuth angle of a target in the elevation angle direction at the stopping point with respect to a reference direction during said stopping point according to received signals from said at least two receiving antennas and the rotation angle of said antenna substrate at the stopping point.

10. The automotive radar according to claim 9, wherein said drive rotates said antenna substrate in said azimuth direction to perform each scan, in the azimuth direction, from one second antenna detection angle to an adjacent second antenna detection angle of a plurality of second antenna detection angles formed by said at least two receiving antennas, and stops performing scan in the azimuth direction during said stopping point.

11. The automotive radar according to claim 10, wherein said azimuth angle is detected from comparison of difference in amplitude or phase between received signals from said at least two receiving antennas.

12. The automotive radar according to claim 10, wherein said at least two receiving antennas serve also as the transmitting antenna.

13. The automotive radar according to claim 10, wherein first and second detection ranges are formed with said first and second antenna detection angles, and said first and second detection ranges at the stopping point partially overlaps with first and second detection ranges at the stopping point after scans in the next elevation angle direction and azimuth direction respectively.

14. An automotive radar comprising:
- a transmitting antenna which emits an electromagnetic wave;
- at least four receiving antennas which receive said electromagnetic wave reflected by a target, arranged adjacent to each other horizontally and vertically;
- an antenna substrate on which said transmitting antenna and said at least four receiving antennas are arranged;
- a drive which, when said horizontal direction is an azimuth direction, rotates said antenna substrate in said azimuth direction and an elevation angle direction perpendicular to said azimuth direction to perform plural scans, in the azimuth direction and elevation angle direction, each from one antenna detection angle to an adjacent antenna detection angle of a plurality of antenna detection angles each formed by said at least four receiving antennas, and provides each stopping point of said antenna substrate between a scan and a next scan; and
- a signal processor which detects the azimuth angle and elevation angle of a target with respect to a reference direction during said stopping point according to received signals from said at least four receiving antennas and the rotation angle of said antenna substrate at the stopping point in the azimuth direction and elevation angle direction.

15. The automotive radar according to claim 14, wherein said azimuth angle is detected from comparison of difference in amplitude or phase between received signals from horizontally aligned receiving antennas among said at least four receiving antennas, and said elevation angle is detected from comparison of difference in amplitude or phase between received signals from vertically aligned receiving antennas among said at least four receiving antennas.

16. The automotive radar according to claim 15, wherein said at least four receiving antennas serve also as the transmitting antennas.

17. The automotive radar according to claim 15, wherein a detection range is formed with said antenna detection angle, and said detection range at the stopping point partially overlaps with a detection range at the stopping point after a scan in the next elevation angle direction and azimuth direction.

* * * * *